United States Patent
Wang et al.

(10) Patent No.: US 7,964,324 B2
(45) Date of Patent: Jun. 21, 2011

(54) METHOD FOR IMPREGNATING A SOLID OXIDE FUEL CELL CATHODE WITH SILVER TO REDUCE ELECTRICAL RESISTANCE

(75) Inventors: Su-Chee Simon Wang, Troy, MI (US); Kailash Chandra Jain, Troy, MI (US); Joseph M. Keller, Grand Blanc, MI (US); Rick D. Kerr, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/475,626

(22) Filed: Jun. 1, 2009

(65) Prior Publication Data

US 2010/0143761 A1 Jun. 10, 2010

(51) Int. Cl.
*H01M 8/00* (2006.01)
*H01M 4/02* (2006.01)
*H01M 4/36* (2006.01)
*H01M 4/34* (2006.01)

(52) U.S. Cl. ......... 429/535; 429/523; 429/400; 429/219
(58) Field of Classification Search ............... 502/101; 429/535, 523, 400, 219
See application file for complete search history.

(56) References Cited

U.S. PATENT DOCUMENTS

| | | | | |
|---|---|---|---|---|
| 3,438,805 A | * | 4/1969 | Potrafke | 427/229 |
| 3,649,365 A | * | 3/1972 | Morgan | 502/101 |
| 2002/0177031 A1 | | 11/2002 | Doshi et al. | |

OTHER PUBLICATIONS

Doshi, Rajiv, Von L Richards, J. D. Carter, Xiaoping Wang, Michael Krumpelt. :Development of Solid-Oxide Fuel Cells that Operate at 500 C. Journal of the Electrochemical Society 146 (4) 1273-1278 (1999).*
Haanappel, V.A.C., et al, "The influence of noble-metal-containing cathodes on the electrochemical performance of anode-supported SOFCs," J. Power Sources, 130 (2004) 119-128.
Singhal, S.C., "Solid Oxide Fuel Cells for Stationary, Mobile, and Military Applications," Solid State Ionics, 152-153 (2002) 405-410.
Zizelman, J., et al, "Solid Oxide Fuel Cell Auxiliary Power Unit—A Development Update," SAE World Congress 01-0411, 2002.
Armstrong, T.J., et al, "Performance of Solid Oxide Fuel Cells with LSGM-LSM Composite Cathodes," J. Electrochem. Soc., 149(12), A1565-A1571, 2002.
Minh, N., Symposium FF—Materials for Fuel Cells and Fuel Processors, Session FF3.1, Dec. 2, 2002, p. 693 Boston, MA.
Singhal, S.C., et al, "High Temperature Solid Oxide Fuel Cells; Fundamentals, Designs and Applications," Elsevier Ltd., Chapter 6.1-6.4, pp. 149-155, 2003.

(Continued)

*Primary Examiner* — Helen O Conley
(74) *Attorney, Agent, or Firm* — Thomas N. Twomey

(57) ABSTRACT

A method for improving performance of an SOFC by impregnation of the cathode with metallic silver. A solution of $AgNO_3$ in acetonitrile is imbibed into a perovskite cathode fabricated on a electrolyte layer supported by an anode, defining an SOFC cell. The cathode imbibition may be repeated a plurality of times as may be needed depending upon the thickness of the cathode. The amount of solution soaked into the cathode results a total final weight percent of Ag in the cathode between about 0.5% and about 10%. The cathode is then fired in air at high temperature to drive off the acetonitrile and to reduce the silver ions to metallic silver. In this way, cathode electrical resistance may be reduced by as much as 52%.

14 Claims, 2 Drawing Sheets

OTHER PUBLICATIONS

Adler, S.B., et al, Electrode Kinetics of Porous Mixed-Conducting Oxygen Electrodes, J. Electrochem. Soc., 143(11), 3554-3564, 1996.

Adler, S.B., "Mechanism and Kinetics of Oxygen Reduction on Porous La1-xSrxCoO3-$\delta$ Electrodes," Solid State Ionics 111 (1998) 125-134.

Esquirol, A., et al, "Electrochemical Characterization of La0.6Sr0.4Co0.2Fe0.8O3 Cathodes for Intermediate-Temperature SOFCs," J. Electrochem. Soc. 151(11), A1847-A1855 (2004).

Radhakrishnan, R., et al, "Estimation of Charge-Transfer Resistivity of Pt Cathode on YSZ Electrolyte Using Patterned Electrodes," J. Electrochem. Soc. 152(5), A927-A936 2005.

* cited by examiner

METHOD FOR IMPREGNATING A SOLID OXIDE FUEL CELL CATHODE WITH SILVER TO REDUCE ELECTRICAL RESISTANCE

RELATIONSHIP TO GOVERNMENT CONTRACTS

The present invention was supported in part by a US Government Contract, No. DE-FC26-02NT41246. The United States Government may have rights in the present invention.

TECHNICAL FIELD

The present invention relates to solid oxide fuel cells; more particularly, to methods of forming a cathode for a solid oxide fuel cell; and most particularly, to a method for treating a solid oxide fuel cell cathode to improve functionality.

BACKGROUND OF THE INVENTION

Solid oxide fuel cells (SOFCs) are well known in the art. A typical SOFC comprises a structural, planar anode that is supportive of a thin electrolyte and a thin cathode in an integral multi-layer structure. In use of such an SOFC, oxygen ion migrates through the cathode and electrolyte to react with hydrogen (and other fuels such as CO) in the anode, producing a useful voltage difference and thereby causing current to flow through an external circuit.

A typical prior art SOFC may comprise, for example, Ni-anode supported planar technology using a perovskite oxide such as $La_{0.6}Sr_{0.4}Co_{0.2}Fe_{0.8}O_3$ (LSCF) as the cathode, an oxygen ion conducting yttria stabilized zirconia (YSZ) as the electrolyte, and a nickel-YSZ cermet as the anode.

An LSCF cathode imposes significant material limitations and problems because cathode polarization or resistance is the major source of voltage loss in SOFCs. Therefore, it is desirable to find a catalyst treatment that reduces cathode polarization or resistance during the oxygen reduction reactions occurring in the cathode. In Haanappel et al. (V. A. C. Haanappel, D. Rutenbeck, A. Mai, S. Uhlenbruck, D. Sebold, H. Wesemeyer, B. Rowekamp, C. Tropartz, and F. Tietz, "*The Influence of Noble Metal-Containing Cathodes on the Electrochemical Performance of Anode-Supported SOFCs*," J. Power Source, 130 119, 2004), which is incorporated herein by reference, the influence of noble metals, such as Pt, Pd, and Ag, on the performance of perovskite SOFC cathodes, i.e., $La_{0.65}Sr_{0.33}MnO_3$ (LSM) and $La_{0.6}Sr_{0.4}Co_{0.2}Fe_{0.8}O_3$ (LSCF), is investigated. Silver is an attractive choice because of its relatively low price as compared to platinum and palladium. However, the performance of cathodes sintered at 920° C. with Ag powder and $Ag_2O$ was inferior to that of Ag-free cathodes sintered at the standard temperature (1100° C.). In addition, a detrimental effect was observed when Ag salt precursors such as Ag acetate, Ag citrate, $Ag_2CO_3$, and $AgNO_3$ were applied and then sintered to yield $Ag°$.

What is needed in the art is a method for impregnating Ag into an LSCF or other cathode to improve cathode performance by reducing cathode resistance and increasing cell power density per unit area.

It is a principal object of the present invention to improve cathode performance of an SOFC.

It is a further object of the invention to provide such improvement economically through use of Ag rather than a more costly noble metal.

SUMMARY OF THE INVENTION

Briefly described, in a method in accordance with the present invention, an SOFC cathode is impregnated with Ag to improve its performance. $AgNO_3$ is soluble in polar organic solvents such as acetonitrile ($CH_3CN$). A polar solvent solution of silver nitrate, preferably a $AgNO_3$—acetonitrile solution preferably containing about 0.051 mg of Ag per mg of solution, is imbibed into a perovskite cathode of an SOFC cell. Preferably, the perovskite cathode is LSCF, the electrolyte is YSZ, and the anode is a nickel-YSZ. Preferably, the total final weight percent of Ag in the cathode is between about 0.5% and about 10%, and preferably between about 2.5% and about 5.0%. The cathode imbibition may be repeated a plurality of times as may be needed depending upon the thickness of the cathode. The cell is then fired in air at high temperature, preferably about 700° C., to drive off the vehicle and to reduce the silver ions to metallic silver. In this way, cathode resistance may be reduced by as much as 52%.

BRIEF DESCRIPTION OF THE DRAWINGS

The present invention will now be described, by way of example, with reference to the accompanying drawings, in which.

The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
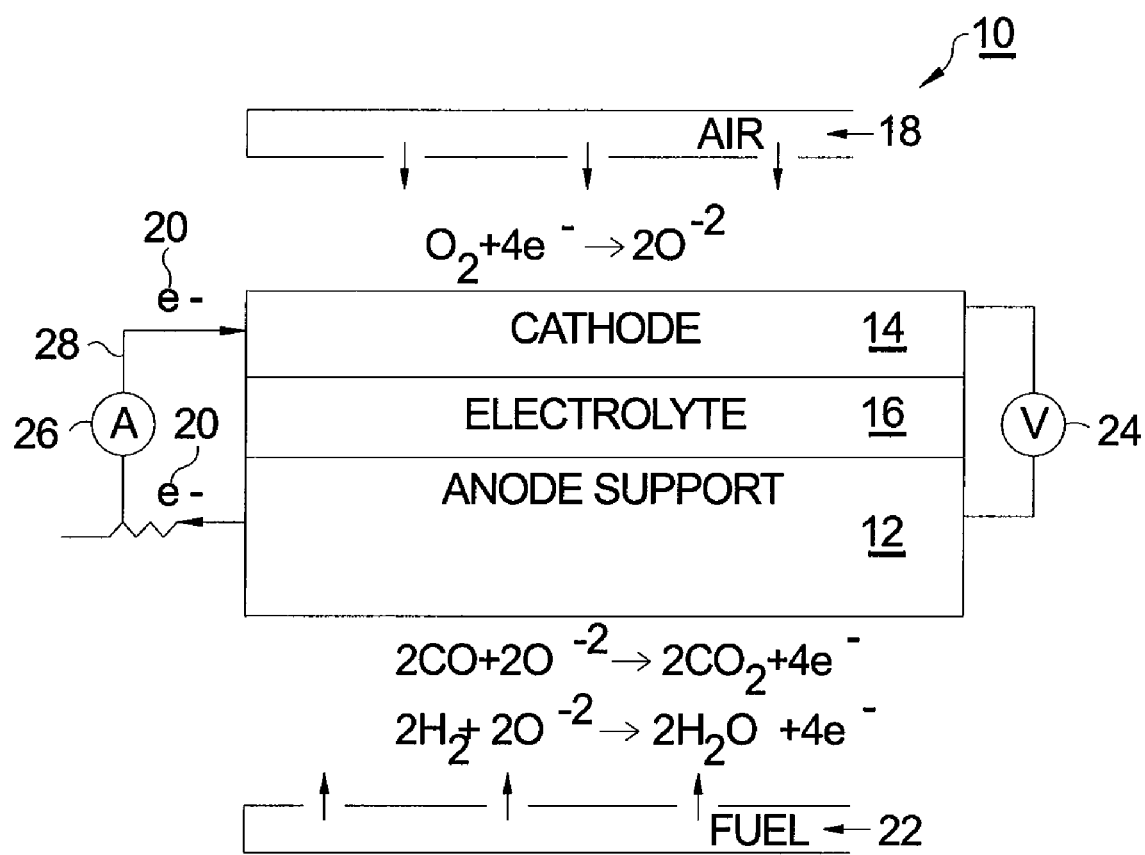
FIG. 1 is a schematic drawing of an anode-supported SOFC and the reactions occurring in the electrodes.

Referring to FIG. 1, a prior art SOFC 10 comprises a supportive anode 12, a cathode 14, and an intervening electrolyte 16. In operation under proper operating temperature, molecular oxygen ($O_2$) within cathode 14 (typically in the form of air 18) accepts two electrons 20 per atom of oxygen. The ionized oxygen atoms ($O^{-2}$) migrate selectively through the electrolyte to the anode where they oxidize fuel 22 in the form of hydrogen ($H_2$) and carbon monoxide (CO) to produce water ($H_2O$) and carbon dioxide ($CO_2$), respectively, thereby creating a voltage difference 24 causing current 26 to flow in an external circuit 28 from anode 12 to cathode 14.

As reported in the literature and noted above, using $AgNO_3$ as a precursor for emplacing $Ag°$ in an SOFC cathode has been shown to have a detrimental effect on cathode performance and therefore is deemed unsuccessful in the prior art in meeting the goal of reduced cathode resistance and increased cell power density. It has been confirmed that cathode resistance increases when an aqueous solution of $AgNO_3$ is used to impregnate Ag in the electrode and then sintered. This phenomenon may be caused by the formation in the cathode of an adverse hydroxide compound originated from the aqueous solution during the impregnation and the subsequent firing processes.

$AgNO_3$ is a polar ionic compound (a salt). Therefore, use of a non-aqueous polar organic solvent in which $AgNO_3$ is soluble suggested a possible pathway for impregnating Ag into a perovskite cathode. In the search for a suitable solvent, it was found that $AgNO_3$ is substantially insoluble in most non- or low-polarity organic solvents. Further, use of oxygen-containing polar solvents such as ethanol, dimethyl ether, and glycerin provided no benefit in reducing cathode resistance, and the silver produced in the cathode exhibited the same undesirable beading and agglomeration behavior as in the trials reported for aqueous solvents in the prior art.

Surprisingly and beneficially in accordance with the present invention, $AgNO_3$ is found to be suitably soluble in some non-oxygen containing polar solvents such as aliphatic nitrites, especially acetonitrile ($CH_3CN$). When a cathode is impregnated with a solution thereof and is subsequently sintered in air to drive off the vehicle and nitrate and to reduce the ionized silver atoms, atomic or sub-micron sized metallic silver ($Ag°$) is found to be distributed throughout the cathode, with no trace of beading or agglomeration. In electrical tests of such a treated cathode, the electrical resistivity is found to be substantially reduced and the power density is substantially increased. It is believed that this effect may be caused by silver moieties on this scale catalyzing the reduction of elemental oxygen to oxygen ion.

In a currently preferred method in accordance with the present invention, a solution of $AgNO_3$ in acetonitrile is prepared, preferably comprising about 0.051 mg of $AgNO_3$ per mg of solution. This solution is imbibed into the cathode of an anode-supported SOFC which is then fired to a preferred temperature of about 700° C.

Preferably, the SOFC anode comprises Ni—YSZ cermet and the electrolyte comprises YSZ.

In any given application, the optimum concentration of solution, the amount of solution imbibed and the length of firing are functions of at least the thickness and composition of the cathode and may be readily determined in known fashion without undue or unexpected experimentation.

The above-described method is especially useful for treatment of perovskite cathodes formed of, for example, LSCF or LSM.

Figure 2:
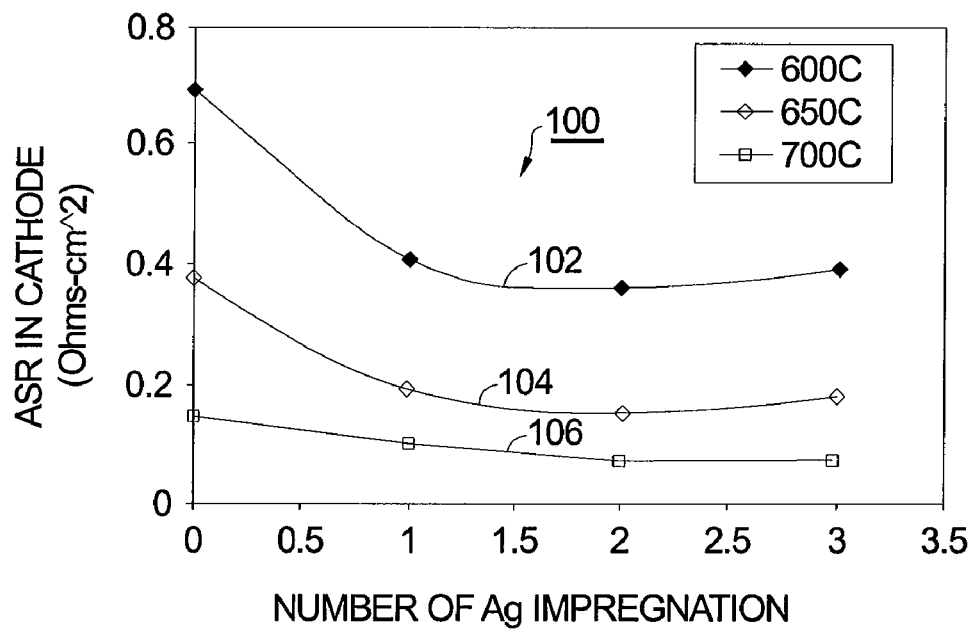
FIG. 2 is a graph showing reduction in cathode resistance as a function of numbers of successive cathode impregnations and a function of SOFC operating temperature.

Referring now to FIG. 2, graph 100 shows reduction in area specific cathode resistance (ASR) as a function of numbers of successive cathode impregnations and a function of cathode operating temperature. Curve 102 shows ASR at 600° C., curve 104 shows ASR at 650° C., and curve 106 shows ASR at 700° C. It is seen that, for the LSCF cathode tested, some improvement was realized by repeating the imbibition and firing a second time, but little if any benefit was realized by an additional treatment.

Figure 3:
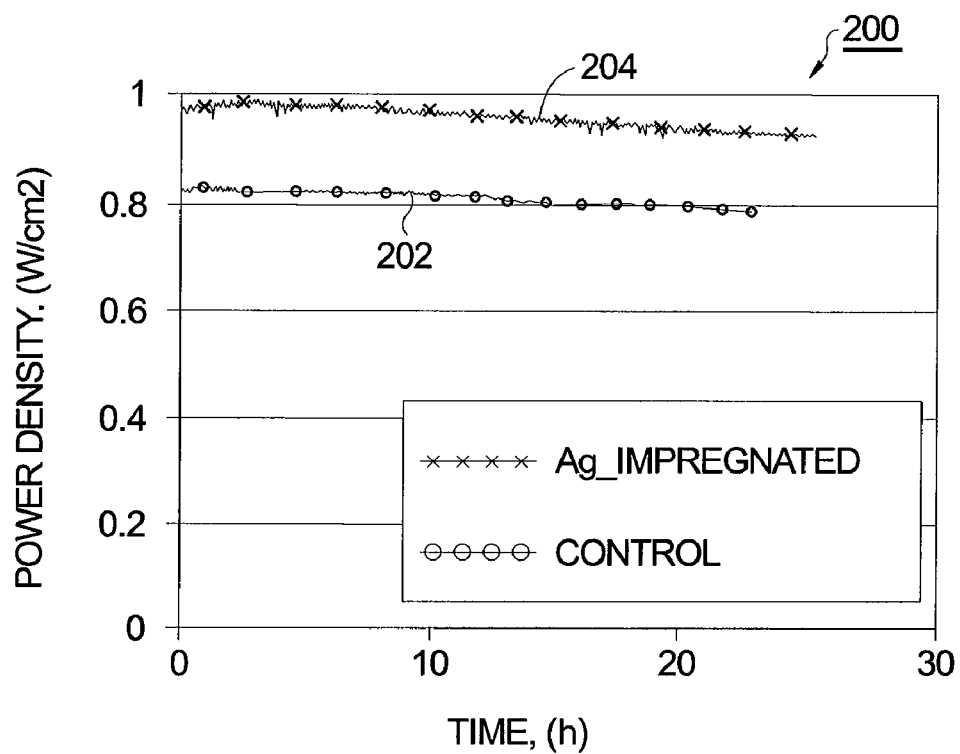
FIG. 3 is a graph showing SOFC power density over operating time as a function of silver cathode impregnation in accordance with the present invention.

Referring now to FIG. 3, the beneficial results 200 of cathode treatment in accordance with the present invention are shown. A control (non-treated) SOFC exhibits power density in watts/cm2 of about 0.8 (curve 202), whereas an SOFC having an impregnated cathode treated in accordance with a method of the present invention exhibits power density of about 0.95 or greater (curve 204), an increase in this example of about 20%. However, as shown in FIG. 2, cathode resistance may be reduced by as much as 52%, depending in part upon the temperature of fuel cell operation.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for reducing electrical resistance in a fuel cell having an anode, an electrolyte, and a cathode, comprising the steps of:
    a) preparing a solution of a silver salt in a non-aqueous polar organic solvent;
    b) imbibing an amount of said solution into said cathode of said fuel cell; and
    c) firing said cathode to a temperature of at least 600° C. to drive off said non-aqueous polar organic solvent and to reduce said silver salt to metallic silver.

2. A method in accordance with claim 1 wherein said silver salt is silver nitrate.

3. A method in accordance with claim 2 wherein said solution comprises about 0.051 mg of silver nitrate per mg of solution.

4. A method in accordance with claim 1 wherein said non-aqueous polar organic solvent is an aliphatic nitrile.

5. A method in accordance with claim 4 wherein said aliphatic nitrile is acetonitrile.

6. A method in accordance with claim 1 wherein said fuel cell is a solid oxide fuel cell.

7. A method in accordance with claim 6 wherein said anode comprises a nickel and yttria stabilized zirconia cermet.

8. A method in accordance with claim 6 wherein said electrolyte comprises yttria stabilized zirconia.

9. A method in accordance with claim 1 wherein said firing temperature is about 700° C.

10. A method for reducing electrical resistance in a fuel cell having an anode, an electrolyte, and a cathode, comprising the steps of:
    a) preparing a solution of a silver salt in a non-aqueous organic solvent;
    b) imbibing an amount of said solution into said cathode of said fuel cell; and
    c) firing said cathode to a temperature sufficient to drive off said non-aqueous organic solvent and to reduce said silver salt to metallic silver.

11. A method in accordance with claim 10, wherein said non-aqueous organic solvent consist essentially of a non-aqueous polar organic solvent.

12. A method in accordance with claim 10, wherein said non-aqueous polar organic solvent is substantially oxygen free.

13. A method in accordance with claim 12, wherein said non-aqueous polar organic solvent consist essentially of aliphatic nitriles.

14. A method in accordance with claim 12, wherein said non-aqueous polar organic solvent consists essentially of acetonitrile.

* * * * *